CHARLES P. CASE.
Improvement in Saw-Filing Machines.

No. 114,921.  5 Sheets--Sheet 1.  Patented May 16, 1871.

Witnesses.  Inventor

CHARLES P. CASE.
Improvement in Saw-Filing Machines.

No. 114,921.  Patented May 16, 1871.

Witnesses.
Chas Kenyon
Villette Anderson.

Inventor:
C. P. Case.
Chipman, Hosmer & Co
Att'ys

CHARLES P. CASE.
Improvement in Saw-Filing Machines.

Patented May 16, 1871.

Witnesses.
Cha Kenyon
Villette Anderson,

Inventor.
C. P. Case
Chipman, Hosmer & Co
Attys.

CHARLES P. CASE.
Improvement in Saw-Filing Machines.
No. 114,921.  Patented May 16, 1871.
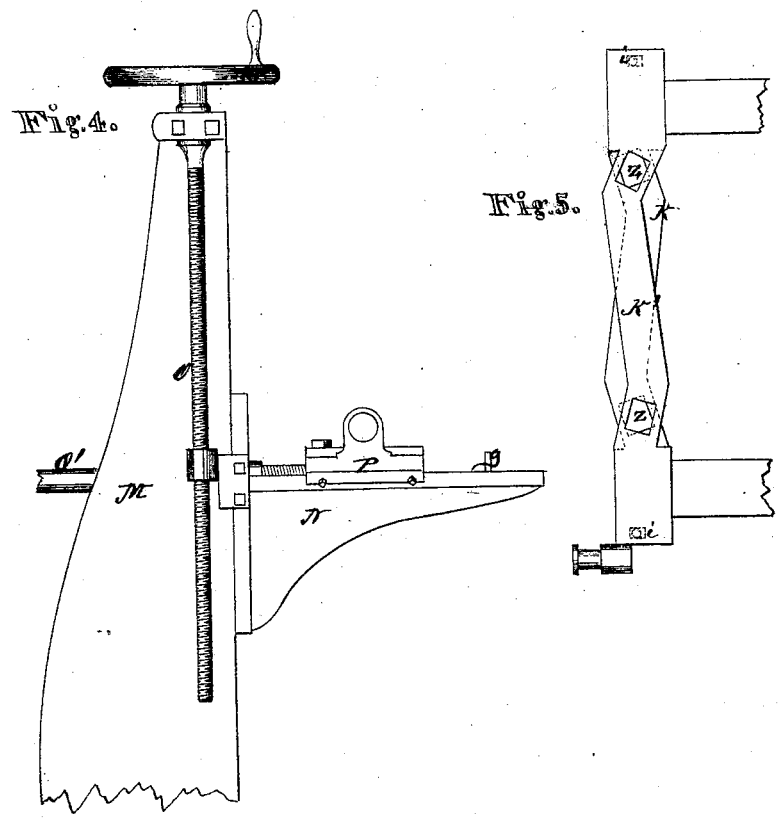
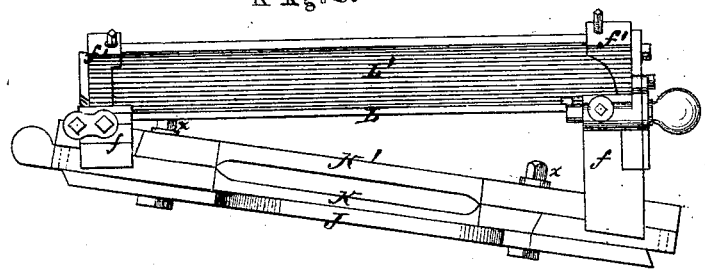
Witnesses.
Chas. Kenyon
Villette Anderson
Inventor.
C. P. Case
Chipman, Hosmer &Co.
Attys.

CHARLES P. CASE.
Improvement in Saw-Filing Machines.

No. 114,921.                     Patented May 16, 1871.

Witnesses.
Chas. Kenyon.
Villette Anderson.

Inventor.
C. P. Case,
Chipman, Hosmer & Co.,
Attys.

United States Patent Office.

CHARLES P. CASE, OF TROY, PENNSYLVANIA.

Letters Patent No. 114,921, dated May 16, 1871.

IMPROVEMENT IN SAW-FILING MACHINES.

The Schedule referred to in these Letters Patent and making part of the same.

*To all whom it may concern:*

Be it known that I, CHARLES P. CASE, of Troy, in the county of Bradford and State of Pennsylvania, have invented a new and valuable Improvement in Saw-Filing Machines; and I do hereby declare that the following is a full, clear, and exact description of the construction and operation of the same, reference being had to the annexed drawing making a part of this specification and to the letters and figures of reference marked thereon.

Figure 1 of the drawing is my machine in plan view, and

Figure 4 is a side view, showing the mechanism for raising and lowering the saw-holder.

Figure 5 is a plan view of a portion of the file-holder.

Figure 6 is a front view of the file-holder.

The nature of my invention consists in the construction and arrangement of a saw-filing machine, as will be hereinafter fully set forth.

In order to enable others skilled in the art to which my invention appertains to make and use the same, I will now proceed to describe its construction and operation, referring to the annexed drawing.

A represents the frame of my machine, upon one end of which, in suitable journal-boxes, is placed a cross-shaft, having a pulley, B, for attaching a belt from any power. I have attached a crank to this pulley to show that it may be operated by hand.

On the front end of this shaft is a crank connected by a pitman, C, with the file-holder or carriage.

There is also a beveled cog-wheel or miter-wheel, D, which gears with a pinion, $a$, upon a shaft, E, running longitudinally with the frame A, and having a fly-wheel, G, upon the other end.

Figure 1:
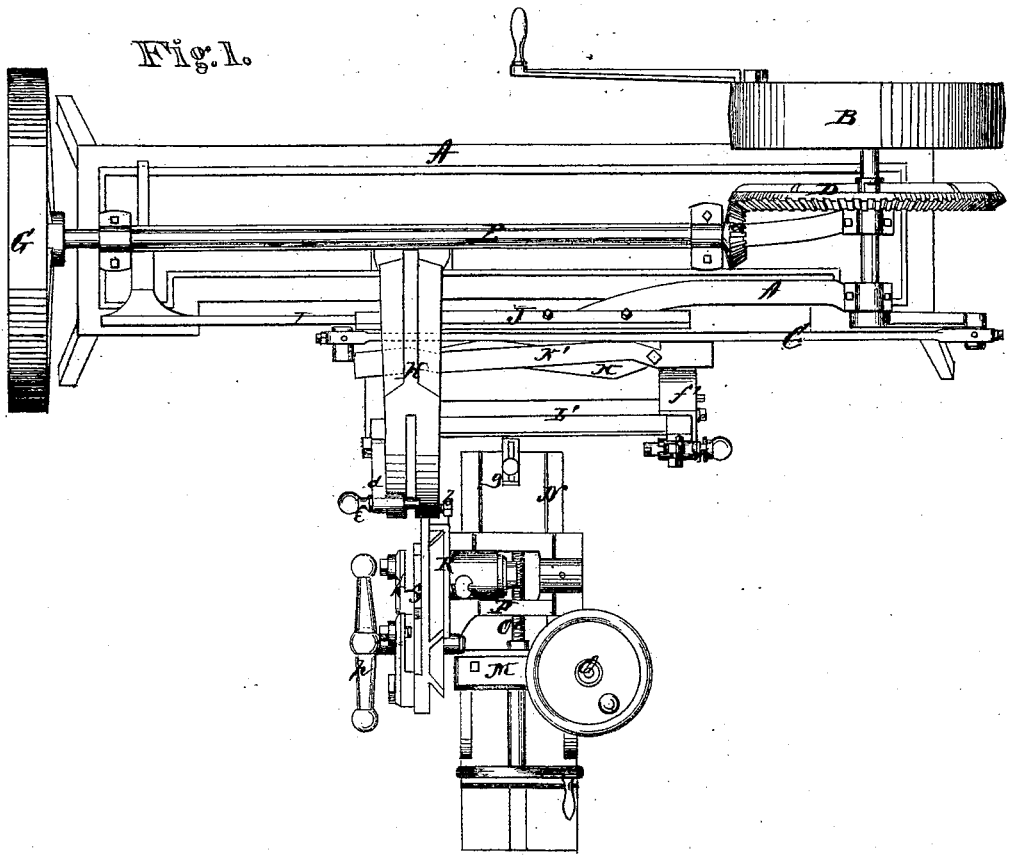

From a suitable point on the frame A rises an L-shaped standard, H, the upper or front end of which is curved and slotted, as shown in fig. 1, to form a convenient guide in which the saw is to be held while filing.

In the ends of this guide are set-screws, $b$, for holding the saw.

Figure 2:
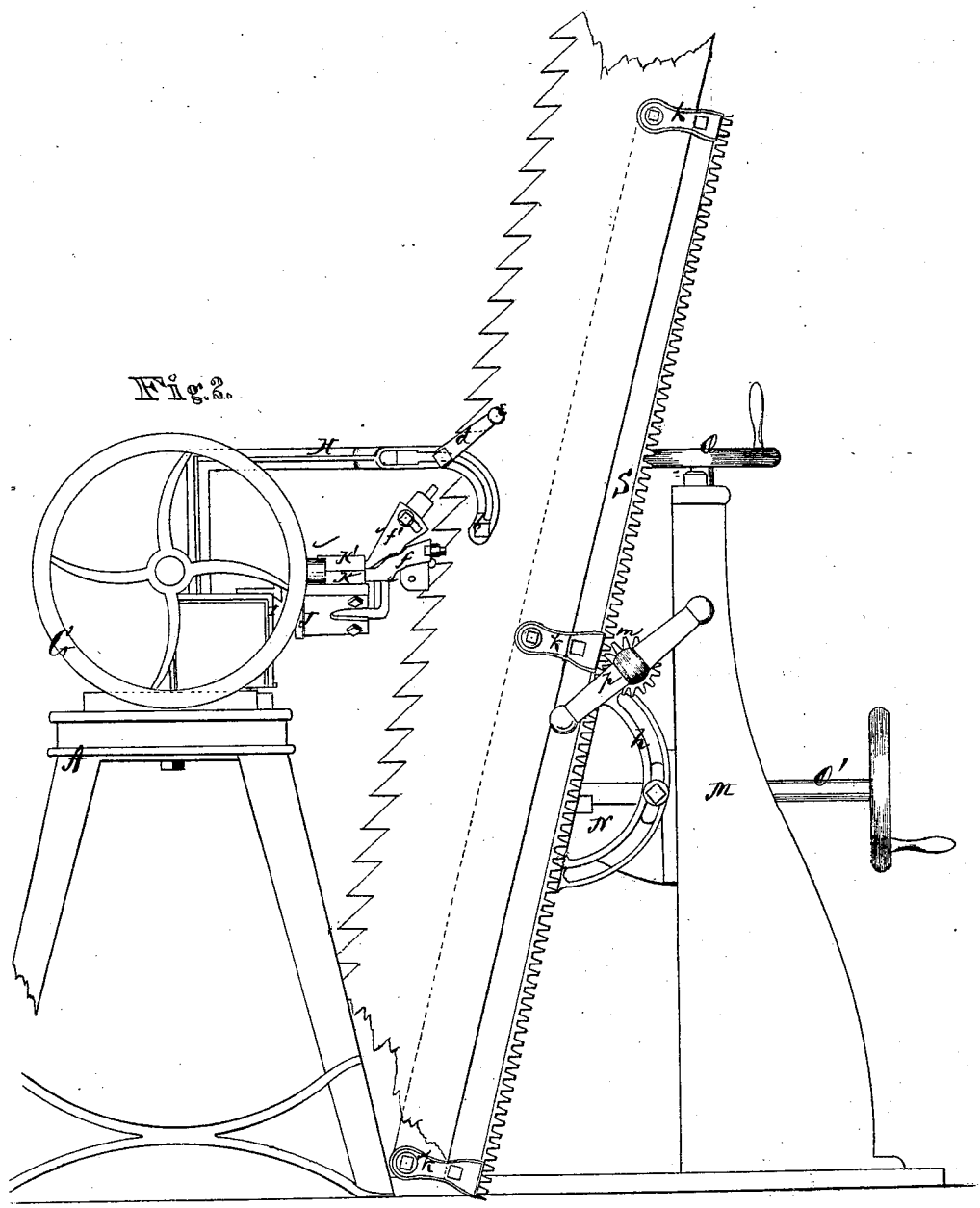
Figure 2 is a side elevation of the same, showing the machine in position for filing a straight saw.

There is also an arm, $d$, with a pin, $e$, to be inserted in one of the notches above the tooth to be filed, so as to get the proper distance between them. This arm is adjustable, one side of the end of the guide H being slotted, as shown in fig. 2, and said arm secured in said slot at any point and at any angle by means of a bolt or screw.

On the front side of the frame A is a stationary dovetailed guide, I, upon which the carriage J moves back and forth.

Two bars, K and K', are secured on the carriage J by means of two bolts which pass through elongated oblique slots $z\ z$ in the bars.

These bars are constructed in the peculiar form shown in fig. 5, and placed one above the other, the lower bar K having a transverse slot at each end, in which a pin, $i$, from the under side of the upper bar K' is placed; therefore the bars K K' cannot move longitudinally with reference to each other; they simply have, with respect to each other, lateral motion, and are caused the one to advance and the other to recede at the same time by the traction of the pitman through the operation of the bolts $x\ x$ and the oblique guiding-slots $z\ z$. These slots $z\ z$ are reversed in each bar. With reference to the line of movement of the pitman the angle made by the oblique slots in the upper bar K' is supplemental to the angle made therewith by the slots $z$ in the lower bar K.

From near the ends of each of said bars arms $f\ f$ and $f'\ f'$, respectively, extend forward and upward.

In the ends of the arms $f\ f$ is inserted the file or files L L which file the front of the tooth, and in the ends of the arms $f'\ f'$ are placed the files L' which file the back of the tooth. These files are adjustable so as to regulate their inclination.

On the further end of the bar K is a wrist-pin, upon which the pitman C is attached, and by the motion of which the file-carriage receives its motion. Each file or set of files acts independently of the other and takes its cut alternately, so that when the pitman pushes the carriage the bottom file is thrown forward and into contact with the tooth of the saw, and so takes its cut on the direct half of the stroke, while by the same motion the top file is thrown backward and away from the tooth; and so, *vice versa*, when the pitman draws the carriage the top file is drawn forward on the tooth, while the bottom file is thrown off and rides clear of the tooth in its turn, so that there is but one cutting at a time and there is one cutting at all points of the stroke, except when the crank is on the dead-center or taking up the lost motion occasioned by the angular slots in the bars. The files must be put into the holders so as to cut in opposite directions.

In front of the frame A, and a suitable distance from it, is an upright standard, M, which is slotted vertically through the center.

In this slot moves a table or platform, N, which points toward the frame A.

Figure 3:
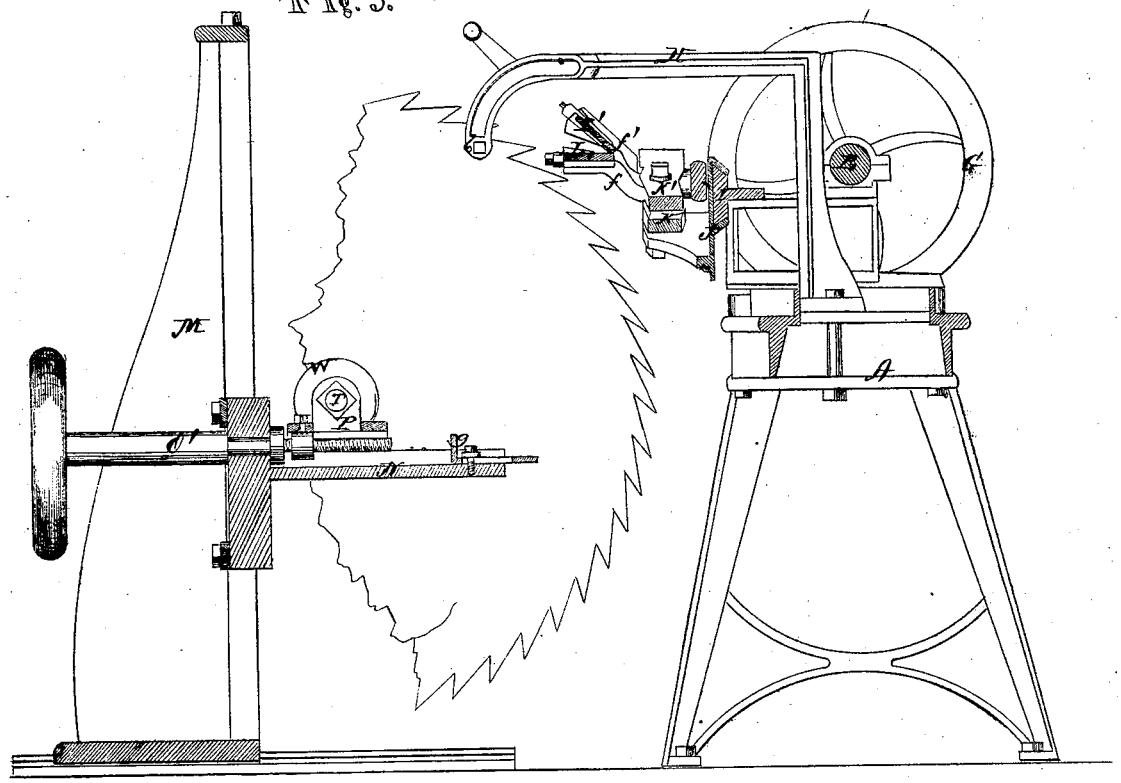
Figure 3 is a transverse vertical section of the machine, showing it in position for filing a circular saw.
Figure 7:
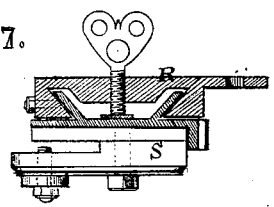
Figure 7 represents a transverse section of the saddle in which the saw-clamp slides.
Figure 8:
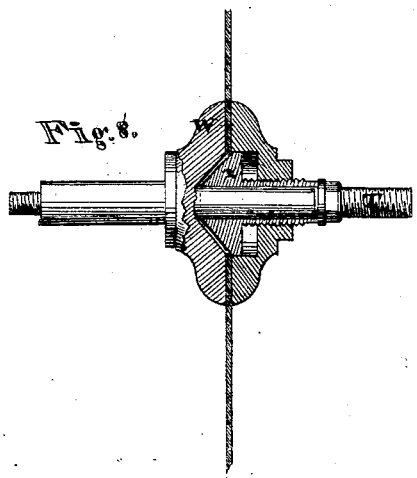
Figure 8 represents a sectional view of the saw-clamps which are used for holding circular saws.

This platform is moved up and down by means of a large screw, O, as shown in fig. 4, and forms guides for a horizontally-moving carriage, P, which is adjusted to or from the files by means of the horizontal screw O', as shown in fig. 3.

On the outer end of the platform is a slide, $g$, which acts as a stop to limit the feed of the saw into the files to any given point, the saw being gradually fed into the file, by the operator acting on the hand-wheel attached to the horizontal screw, until the shortest tooth in the saw is given a perfect point. Then the stop or slide $g$ is moved hard against the carriage, and there secured by its screw, so that in filing each alternate tooth it will prevent the saw from being driven into the files beyond that line, thus serving to point a saw in a very perfect manner. After a tooth has been filed it is withdrawn from the files by means of the horizontal screw $O'$, and the succeeding tooth is then fed forward into the files, to be acted on in like manner.

In a box upon the carriage P is placed a journal attached to a dovetailed guide, R, which is adjusted, at any angle desired, by means of a bolt passing through a segmental or semicircular slotted brace, $h$.

In the guide R is placed a rack-bar, S, provided with clamps $k\ k$ for securing to it a straight saw. These various parts are so arranged that the teeth of the saw will come into the slotted end of the guide H, as above described.

The rack-bar S, with the saw, is raised and lowered at pleasure by means of a pinion, $m$, the shaft of which is provided with a hand-lever, $p$, as shown.

When it is desired to file a circular saw the guide R is removed and a screw-shaft, T, put in its place on the carriage P.

Upon this screw-shaft is a circular concave clamp, W, for confining the saw in place.

Inside of this clamp, and working on the screw-shaft, is a conical bush, $x$, which serves to center the different-sized saws in use. This bush is made of steel and tempered so as not to be injured by being driven into the center of the saw. It is driven up by means of a flange-nut acting against it on the end of the screw-shaft. This bush is threaded back of the cone, and forms a screw for the loose arbor or clamp to be screwed up against the saw.

Having thus fully described my invention,

What I claim as new, and desire to secure by Letters Patent, is—

1. The L-shaped standard or guide H, having its front end curved and slotted, as described, and provided with set-screws $b\ b$, adjustable arm $d$, and pin $e$, substantially as and for the purposes herein set forth.

2. The bars K K', constructed and connected to the carriage J, as shown and described, and provided with arms $f$ and $f'$ for holding the files to be operated by the motion of the pitman C, substantially as herein set forth.

3. The adjustable guide R, provided with slotted segmental brace $h$, in combination with the rack-bar S, clamps $k\ k$, and pinion $m$, substantially as and for the purposes herein set forth.

4. The arrangement of the slotted standard M, adjustable platform N, carriage P, sliding stop $g$, and screws O O', all as shown and described, and for the purposes set forth.

5. In combination with the pitman of a saw-filing machine, the bars K K', provided with the oblique slots $z\ z$ and the bolts $x\ x$ moving with and parallel with the pitman, substantially as specified.

6. The file-carrier described, or its equivalent, provided with files L L', and adapted automatically to produce a reciprocal and alternate action of said files on their respective sides of a saw-tooth, and whether used in combination with machinery for moving the same or not.

In testimony that I claim the above I have hereunto subscribed my name in the presence of two witnesses.

CHAS. P. CASE.

Witnesses:
 WILL SHAKESPEARE,
 C. R. BURNETTE.